(12) United States Patent
Tippery et al.

(10) Patent No.: US 7,448,491 B1
(45) Date of Patent: Nov. 11, 2008

(54) COMBINE HEADER BELT TENSIONING APPARATUS AND METHOD

(75) Inventors: Steve Tippery, Gretna, NE (US); Christoph Nathan, Missouri Valley City, IA (US); Craig Kaster, Omaha, NE (US); Adam Lee Haworth, Louisville, NE (US); Jens Petersen, Omaha, NE (US)

(73) Assignee: Claas Selbstfahrende Erntemaschinen GmbH (DE)

(*) Notice: Subject to any disclaimer, the term of this patent is extended or adjusted under 35 U.S.C. 154(b) by 0 days.

(21) Appl. No.: 11/757,636

(22) Filed: Jun. 4, 2007

(51) Int. Cl.
  *A01D 57/00* (2006.01)
(52) U.S. Cl. ........................ 198/813; 198/814
(58) Field of Classification Search ............... 198/813, 198/814
  See application file for complete search history.

(56) References Cited

U.S. PATENT DOCUMENTS

| | | | |
|---|---|---|---|
| 2,455,905 A | 12/1948 | Ronning et al. | |
| 2,788,883 A * | 4/1957 | Schwenk | 198/813 |
| 4,079,834 A * | 3/1978 | Fletcher et al. | 198/810.04 |
| 4,177,626 A | 12/1979 | McNaught | |
| 4,369,617 A * | 1/1983 | Hanaway et al. | 56/14.6 |
| 4,421,228 A * | 12/1983 | Marsiglio et al. | 198/814 |
| 4,938,010 A | 7/1990 | Guinn | |
| 4,995,506 A * | 2/1991 | Langenbacher et al. | 198/814 |
| 5,005,343 A | 4/1991 | Patterson | |
| 5,632,372 A * | 5/1997 | Steinbuchel et al. | 198/813 |
| 5,896,979 A * | 4/1999 | Hokari et al. | 198/807 |
| 6,202,397 B1 | 3/2001 | Watts et al. | |
| 6,238,131 B1 | 5/2001 | Watts et al. | |
| 6,336,550 B1 * | 1/2002 | Muntener | 198/806 |
| 6,675,568 B2 | 1/2004 | Patterson et al. | |
| 6,695,130 B1 * | 2/2004 | Blaylock et al. | 198/813 |
| 6,769,536 B2 * | 8/2004 | Lutz | 198/861.1 |
| 6,802,414 B2 * | 10/2004 | Buhne | 198/813 |
| 6,817,166 B2 | 11/2004 | Dunn | |
| 6,865,871 B2 | 3/2005 | Patterson et al. | |
| 2002/0129591 A1 | 9/2002 | Patterson et al. | |
| 2004/0148919 A1 | 8/2004 | Dunn | |
| 2005/0016147 A1 | 1/2005 | Patterson et al. | |

* cited by examiner

*Primary Examiner*—Douglas A Hess
(74) *Attorney, Agent, or Firm*—Robert C. Haldiman; Husch Blackwell Sanders LLP

(57) ABSTRACT

A belt tensioning apparatus for a combine or harvester header has a frame with two spaced apart longitudinal support members and at least one transverse member attached to each of the longitudinal support members. An end roller support bracket has two bracket extensions extending longitudinally and disposed to slidingly engage with bracket extension receivers attached to the longitudinal support members. A push rod is longitudinally oriented and slidingly mounted on the transverse member intermediate to the longitudinal support members. The push rod is attached to the end roller support bracket and mounted to have a retracted position and an extended position. An actuator is attached to the longitudinal support members and exerts a substantially uniform force to the push rod along a range of travel of the push rod between the retracted position and the extended position. The actuator may be a scissors assembly or a hydraulic cylinder.

11 Claims, 6 Drawing Sheets

COMBINE HEADER BELT TENSIONING APPARATUS AND METHOD

BACKGROUND OF THE INVENTION

1. Field of the Invention

The present invention is in the field of support and tensioning apparatuses for combine and harvester header transport belts.

2. Related Art

Combine or harvester headers cut a wide swath of crop and transport it to a central feeder house for threshing. Conveyor belts are one of several means for transporting crops from the outer side portions of the header towards the feeder house in the center of the header. Belted headers are sometimes known as "drapers" on agricultural machines. The belts move crop in a direction transverse to the direction of travel of the combine or harvester and from the outside in. Advantageous designs for these belts and their support and drive systems maximize speed, throughput, efficiency, and a robust response to variations in crop density and volume, crop types, variation in terrain and potential impacts to the machine during use.

In order to achieve these overall design goals, as well as to realize the advantages of economy, simplicity, durability and ease of repair that are a constant need in the industry, it is desirable to maintain tension on the belts within a certain preconfigured range. Support systems for the belts should advantageously apply tension in a uniform manner across the width of the belt. It is advantageous if the tensioning force applied to the end roller of the belt does not substantially vary when the longitudinal position of the roller is adjusted. They should allow for adjustments of the tensioning system by an operator. There is a need in the industry for improvement in these areas.

It is also advantageous if the support structure and tensioning apparatus allows for the release of tension and retraction of the apparatus to a degree sufficient to allow repairs to be done to the belt or header. A useful design would minimize binding, gaps between the belt and its adjacent parts and slackness or slippage of the belt. When the drive system for the belt is a friction roller, maintenance of belt tension within a prescribed range is also advantageous.

SUMMARY OF THE INVENTION

The present invention is a belt tensioning system for a combine or harvester header. It is comprised of two longitudinally extending support members, at least one transverse bar between the support members, an end roller, an end roller support bracket, two support bracket extensions corresponding to each of said longitudinal support elements and disposed to engage said longitudinal support elements by sliding in and out of them. The end roller and end roller support bracket are extended and retracted relative to the overall frame by a push rod. The push rod is attached to the end roller support bracket and supported by the transverse member. The push rod is attached to the end roller bracket at a position intermediate to the longitudinal support elements. In the depicted embodiment, the push rod is attached substantially in the center of the end roller bracket.

The push rod may be adjusted to extend or retract longitudinally, that is, in the direction of the length of the belt. In the depicted embodiment the amount of force exerted by the push rod is substantially equivalent in an extended position as the amount of force applied by it in a more retracted position of the end roller.

In one embodiment, the force applied to the push rod is applied by a scissors device. The mechanical scissors extender is symmetrical around the push rod, supported by a second transverse bar and extended or retracted by turning a transverse screw member. Optionally, a compression spring may be mounted with the scissors tensioning device in order to exert a longitudinal force on the push rod. In one depicted embodiment, the spring is disposed at an end of the push rod nearest its attachment to the end roller bracket.

In a second embodiment depicted herein, the push rod is the rod of a hydraulic cylinder. The hydraulic cylinder is in turn mounted on one or more transverse elements within the plane defined by the longitudinal support elements.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
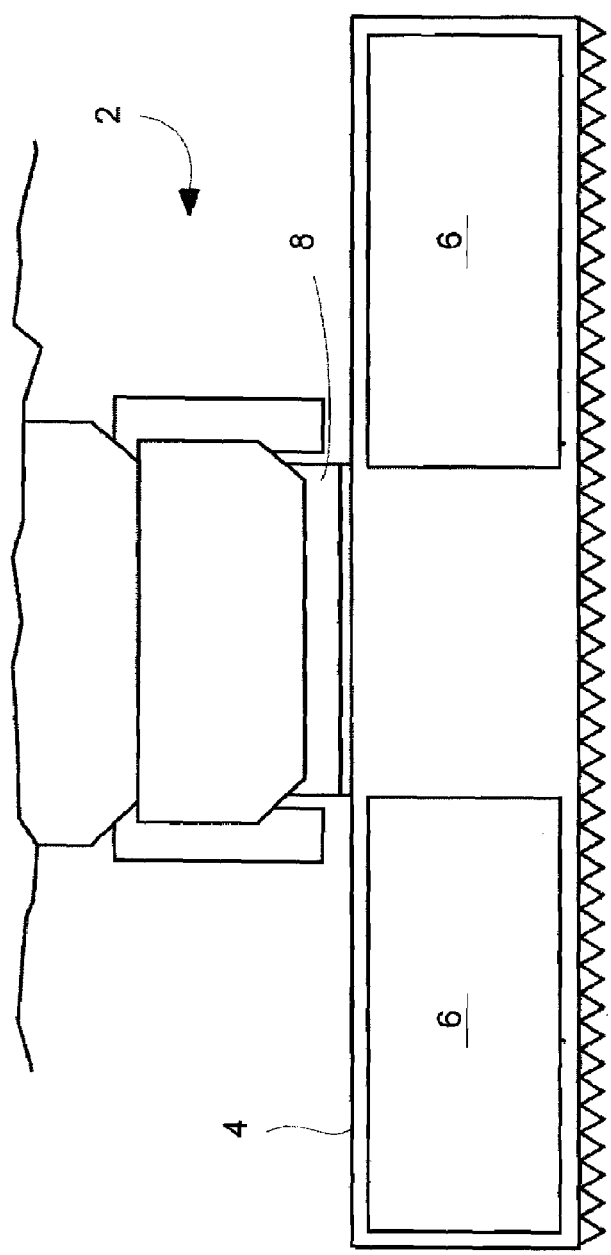
FIG. 1 is a schematic top view of a combine.

Referring now to the drawings in which like reference numbers indicate like elements, FIG. 1 is a schematic top view of a combine 2 having a header 4 with conveyors or "drapers" 6 disposed to convey cut crop towards a feeder house 8 where the combine takes the crop in for threshing. Each belt 6 is supported by a frame and oriented to turn such that the top surface of the belt rotates towards the center of the header and the feeder house.

Figure 2:
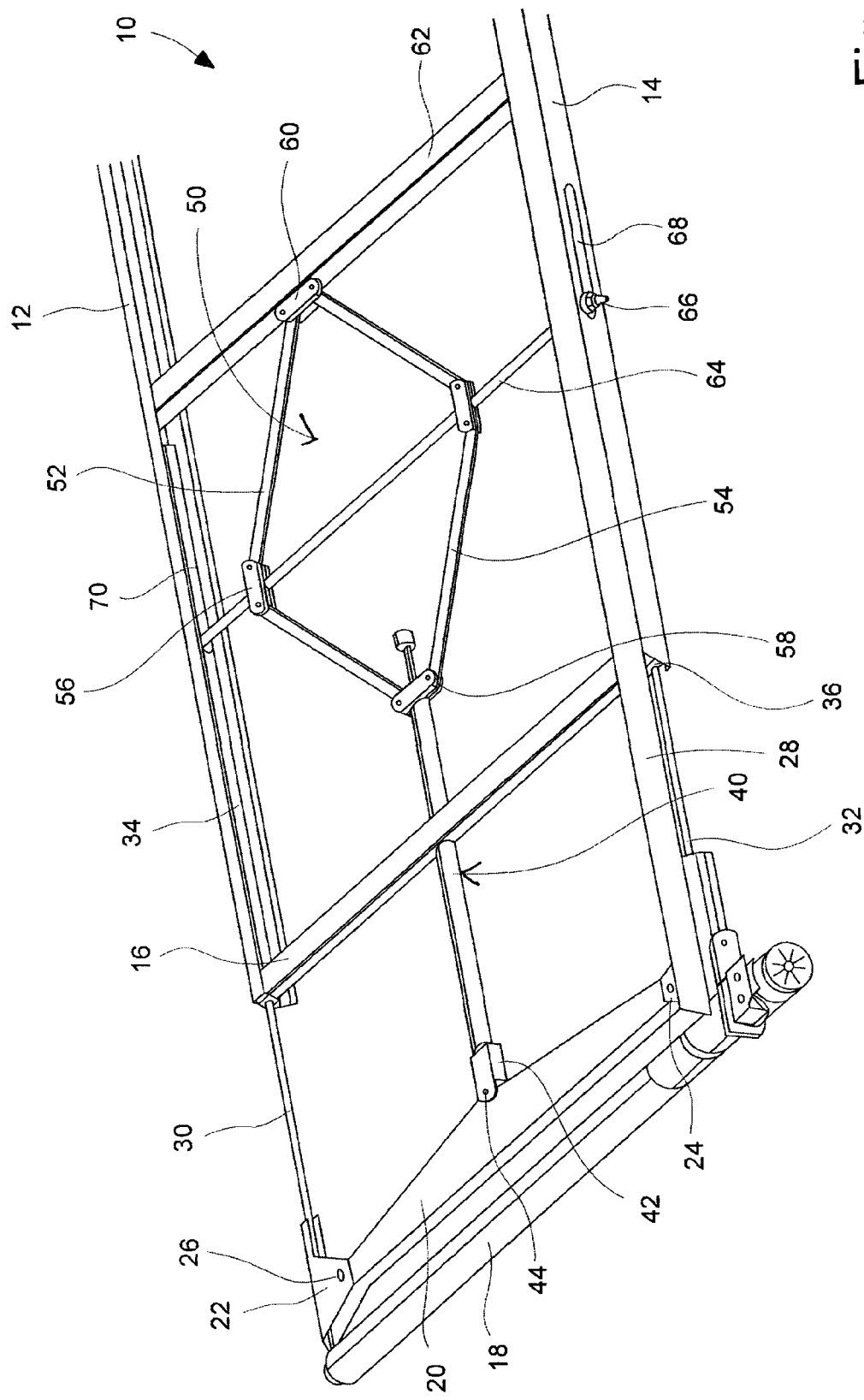
FIG. 2 is a top perspective view of a belt tensioner with a scissors actuator.
Figure 3:
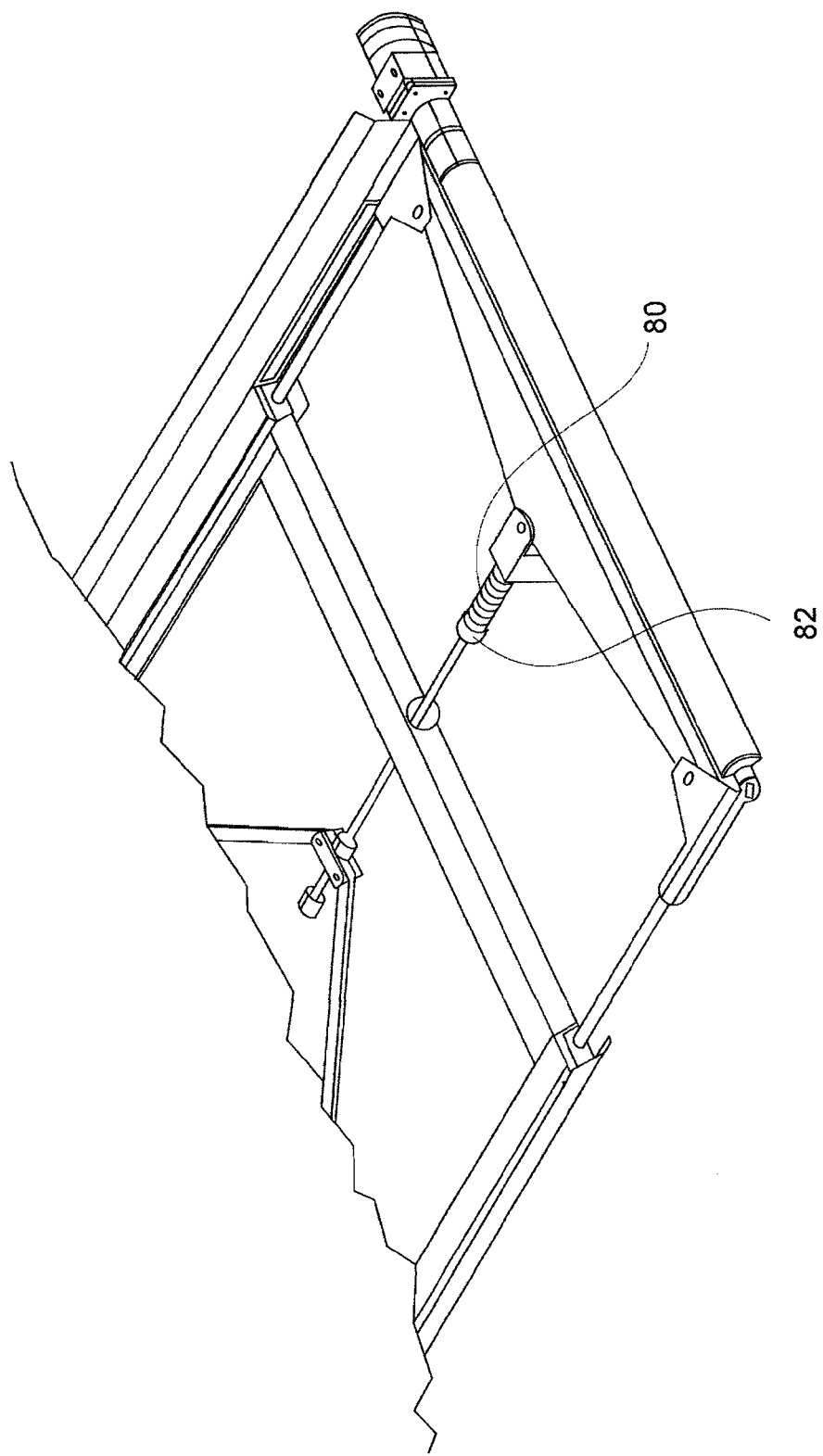
FIG. 3 is a top perspective view of a belt tensioner with a scissors actuator.

In FIGS. 2 and 3, a frame for a combine or harvester header belt is depicted with the supporting header structure and belt removed for clarity. The frame 10 is comprised of a first longitudinal support number 12 and a second longitudinal support number 14. At least one transverse bar 16 spans the distance between them. In the depicted embodiment the belt and transverse members are about 40 inches wide. Together with end roller 18, these structures provide an overall frame which the belt will rotate around. Cut crops will be transferred on the top surface of the belt, which will run over the top surface of the frame 10 toward or away from end roller 18. The tensioning apparatus may be at either or both of the lateral and medial ends of the belt.

End roller 18 is supported by end roller bracket 20. End roller bracket 20 has at its transverse ends an end mount 22 and an opposing end mount 24. End mount 22 is pivotally attached to a transverse end of the end roller support bracket at pivot pin 26. Opposing end mount 24 is similarly attached and is slidingly engaged with extension 28 which extends longitudinally from lateral support number 14. The opposing end mounts 22 and 24 affix end roller bracket extensions 30 and 32 to the end roller bracket 20. Extensions 30 and 32 are longitudinally oriented. They are disposed to slidingly engage extension receivers 34 and 36. Extension receivers 34 and 36 are attached to or integral with an inner aspect of each of said longitudinal support members 12 and 14, respectively. Extensions 30 and 32 may slide in and out of extension receivers 34 and 36, and thereby provide support and stability to the end roller 18 and end roller support bracket 20 through a range of longitudinal positions.

A push rod 40 is disposed in a longitudinal orientation at a position intermediate to the longitudinal support numbers 12 and 14. In the depicted embodiment, the push rod is attached substantially in the center of the end roller support bracket 20. The push rod is supported by a transverse member 16 and disposed to slide through it. The push rod 40 is attached to the end roller support bracket 20 with a push rod fork 42 that is pivotally attached to the end roller support bracket at pin 44. Optionally, push rod 40 may travel through an extended bushing for further stability, as depicted in FIG. 2.

The push rod 40 is extended and retracted by the action of scissors assembly 50. Scissors assembly 50 includes two back arms 52 and two lever arms 54. Each back arm 52 is pivotally attached to hinge nut 56 and each hinge nut is correspondingly pivotally attached to the forward arm 54. Likewise, lever arm mount 58 is attached to the inner aspect of push rod 40 and is pivotally attached to the outer aspect of each lever arm 54. The back arms 52 are further pivotally attached at mount 60 to a second transverse number 62, which provides rigid backing support for the action of the scissors assembly 50 in extending and retracting the end roller support bracket 20 and end roller 18. A transverse rod 64 is threaded and engaged to the internal threads of a through hole on each of hinge nuts 56. The opposing end portions of rod 64 are threaded in opposing directions such that rotation of rod 64 urges travel of both hinge nuts 56 simultaneously towards or away from a center line of rod 64 and also the centerline of the overall frame. The rod 64 is mounted with bolts 66 in slots 68 and 70 in the longitudinal support elements and extension receivers respectively. Slots 68 and 70 are elongated to allow the rod 64 to travel as necessary longitudinally in order to follow the extension or retraction of the push rod by operation of the scissors assembly 50. The rod 64 may be turned by a crank or power drive unit [not shown] which would engage an extension of rod 64 from the back side of the header.

In operation, the tension applied via the push rod to the end roller 18 through the end roller bracket 20 may be adjusted by turning rod 64 in a first rotational direction for extension and in a second direction for retraction. The scissors assembly 50 exerts leverage on the push rod 40 and thereby actuates longitudinal travel of push rod 40. In this manner, the end roller 18 and end roller bracket 20 can be moved to a more retracted position, allowing a looser mounting engagement of the belt, or to a more extended position, allowing a tighter mounting engagement of the belt. By mounting the push rod intermediate to the two longitudinal support members 12 and 14, which in the depicted embodiment is substantially in the center between the longitudinal supports, pressure is exerted on the end roller evenly across its lateral extent, thereby reducing binding effects that may be put on the belt by an uneven application of pressure. It will be apparent to those of skill in the art that in both the scissors jack embodiment above and a hydraulic embodiment discussed below, the mechanism for exerting force on the end roller support bracket is aligned with or symmetrical to the push rod substantially centered on the end roller support racket 20, thus promoting an even application of pressure along the width of the roller. These embodiments also apply substantially even pressure through an extended longitudinal range of motion of the end roller assembly.

As is shown in FIG. 3, a compression spring 80 may be mounted on the pressure rod 40 in order to exert a supplemental tensioning bias on the end roller 18. In this manner, the end roller 18 and support bracket 20 may flex in order to absorb the shock of an impact, or may flex in order to accommodate downward or eccentric pressure on the belt itself in response to variations in the crop load traveling over it, may flex in response to eccentric or upward forces placed on the overall head due to its interaction with uneven ground. The spring 80 may be mounted on the push rod 40 with a fixed stop 82. The stop 82 may optionally be adjusted itself to adjust the tension exerted by spring 80.

Figure 4:
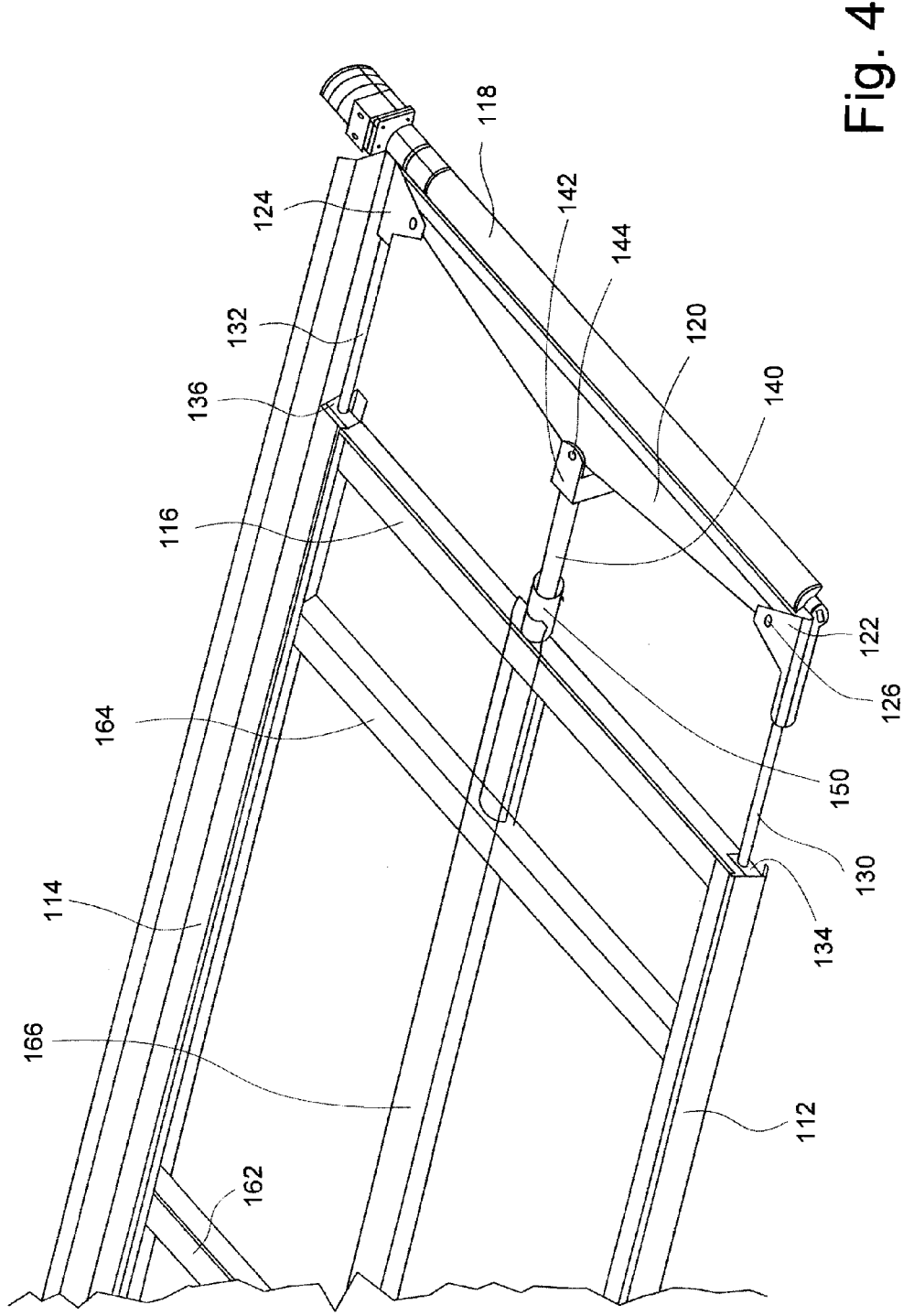
FIG. 4 is a top perspective view of a belt tensioner with a hydraulic actuator.
Figure 5:
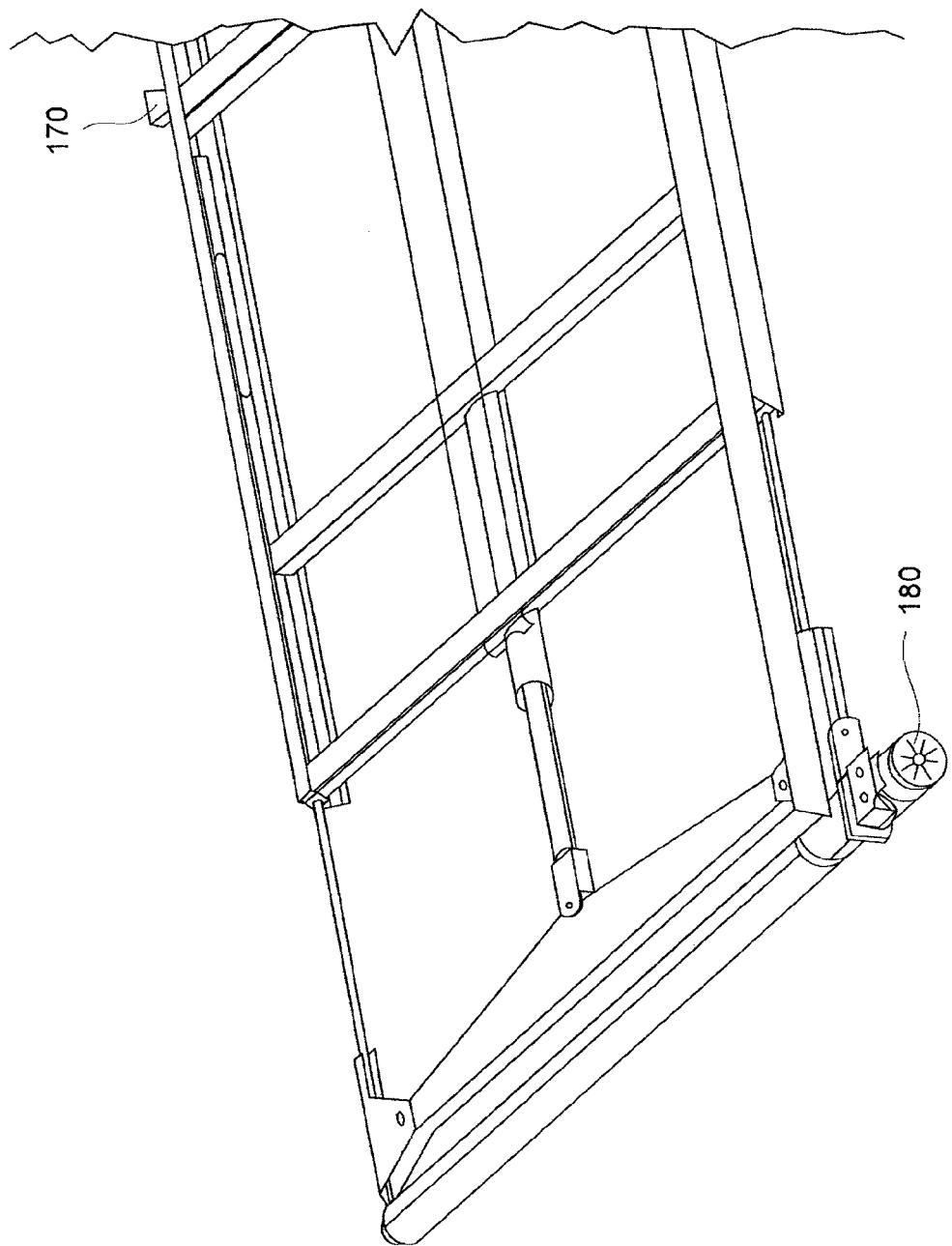
FIG. 5 is a top perspective view of a belt tensioner with a hydraulic actuator.

A second embodiment of the present invention uses a hydraulic actuator. As depicted in FIGS. 4 and 5, the frame of this embodiment also consists of longitudinal support members 112 and 114. At least one transverse member 116 connects the longitudinal support members 112 and 114. The end roller 118 is supported by an end roller support bracket 120. On its transverse ends, end roller support bracket 120 has end mounts 122 and 124 which are pivotally attached to the transverse end portions of end roller support bracket 120 at pins 126. Support bracket extensions 130 and 132 are attached to the end roller support bracket 120 at end mounts 122 and 124. Bracket extensions 130 and 132 are longitudinally disposed for sliding engagement with extension receivers 134 and 136.

A push rod 140 is attached to the end roller support bracket at fork 142 and held there with pin 144. Push rod 140 is the piston rod of a hydraulic cylinder and extends from the cylinder 150. The hydraulic cylinder 150 is longitudinally oriented and maintained in its position by transverse bracket 116 and at least one other bracket 162 and/or 164. Optionally, the hydraulic cylinder may be further mounted under a longitudinal belt guide 166. The hydraulic cylinder in the depicted embodiment is single or double acting and may optionally include a pressure gauge. Optionally, the hydraulic assembly may include a simple hand pump (represented schematically at 170 in FIG. 5) which may also serve to relieve pressure, increase pressure or relax the hydraulic cylinder's tension applied to the belt which is useful for repair and maintenance or selective adjustments.

As will be readily apparent to those of skill in the art, the apparatus can apply a uniform force to the end roller at any position along its range of retraction and extension. A uniform tension is applied to the belt, thus achieving the same uniform pressure on the end roller and tension on the belt as was achieved by the mechanical scissors applicator of the first embodiment. Tensioning adjustment also allows for accommodating belt splice inaccuracies for belt tracking.

As is also apparent to those with skill in the art, the extension members 130 and 132 and their receivers 134 and 136 have a relatively long stroke length that is sufficient for removing the belt for purposes of repair or maintenance when the end roller is in a retracted position. For repair and maintenance purposes, the stroke length of the depicted embodiment is 8 inches. The belt is 40 inches wide. Although various belt widths are within the scope of the invention, the depicted stroke is within the range between 0.1 and 0.3 times the width of the belt, or the distance between the longitudinal support members 32, 132 and 34, 134.

In operation, pressurizing the hydraulic cylinder in a first direction extends push rod 130, thereby causing the end roller 118 on its end roller bracket 120 to travel outwards, carrying the belt to an extended position and placing greater tension on the belt. Pressure in the other direction on the hydraulic cylinder retracts the push rod 140, thereby retracting the end roller 118 on its end roller bracket 120 and shortening the belt and slacking the tension on the belts. The internal pressures of the hydraulic cylinder are available to dampen shocks to the belt or end roller. Optionally, an accumulator may be added to hydraulic system to act as a cushion.

In the depicted embodiments, the end roller 18 is a drive roller, driven by a hydrostatic motor 180. It is within the scope of the present invention that end roller 18 may be a static or idler roller.

Figure 6:
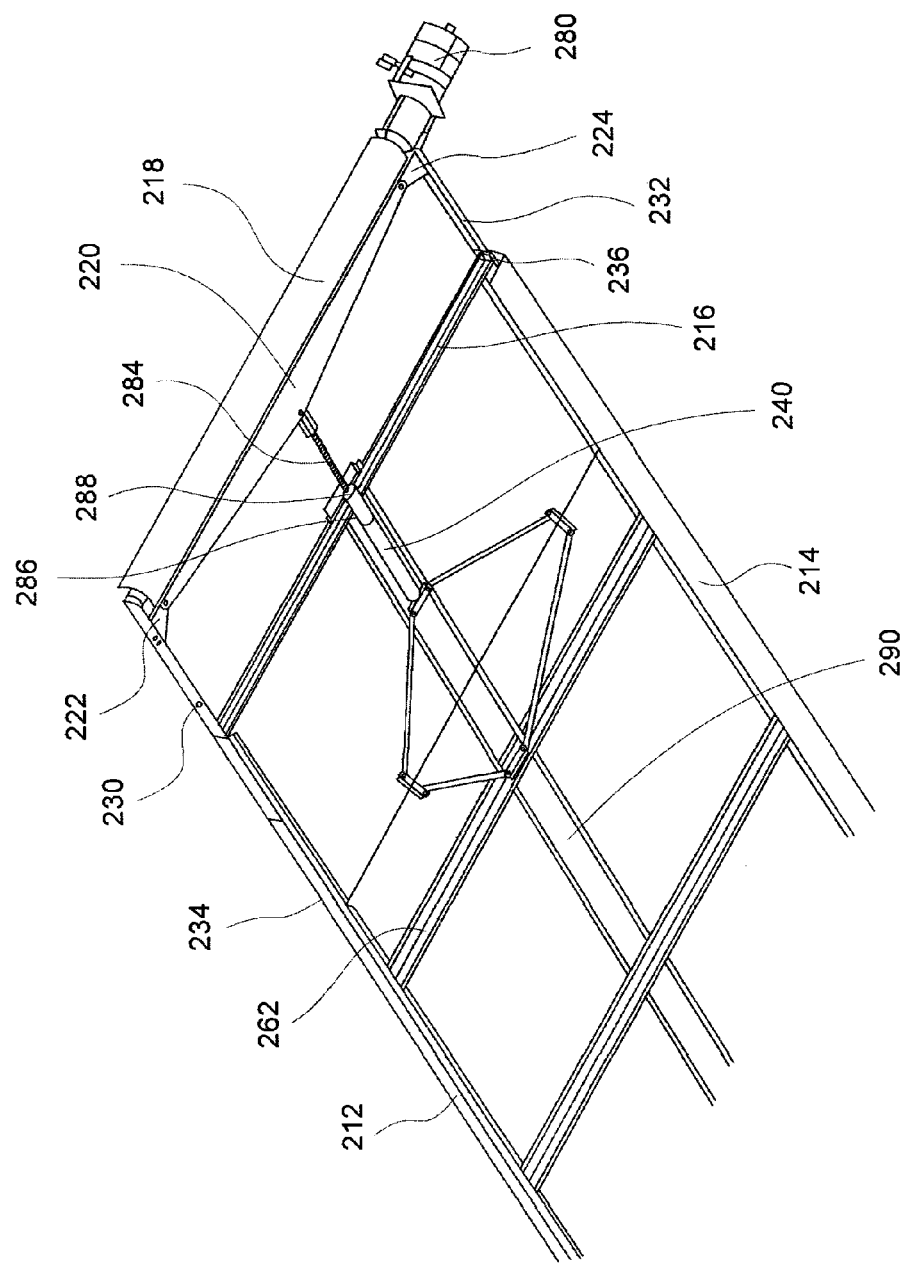
FIG. 6 is a bottom view of an alternate embodiment.

FIG. 6 depicts another alternate embodiment of the present invention. A front longitudinal member 212 and a rearward longitudinal member 214 together with transverse members 216 and 262 comprise a frame. An end roller 218 and end roller support bracket 220 are disposed at an end of the frame. End rollers may be drive rollers or idler rollers, but in FIG. 6, the end roller 218 is a drive roller driven by hydrostatic motor 280. As before end mounts 222 and 224 are pivotally mounted to an end of end roller support bracket 220. End mounts 222 and 224 support end roller support bracket extensions 230 and 232 which are in turn slidingly engaged with the longitudinal members 212 and 214. As can be seen, the bracket extension receivers 234 and 236 in FIG. 6 are integrally formed with the longitudinal members 212 and 214. Also, the end roller support bracket extensions 230 and 232 are not cylindrical but elongated flat pieces of metal having flanges on either end that are formed to slidingly engage corresponding receiving indentations in receiving portions 234 and 236 of longitudinal members 212 and 214.

The scissors assembly in FIG. 6 is as described hereinabove with respect to FIGS. 2 and 3. The bulk of the push rod and then extended bushing or sheath 240 surrounding it is disposed underneath a longitudinal center piece 290 of the frame which serves as a support for the draper conveyor belt that will be mounted over the frame. Again in the embodiment depicted in FIG. 6 a spring 284 is disposed at an end of push rod 240 nearest its attachment to end roller support bracket 220. A mounting bushing, such as attached to transverse member 216 in the depicted embodiment may form a rear stop or string 284. Optionally, mounting bushing 286 may include an adjustable ring 288 for further adjustment of the compression strength of the string 284. A longitudinal belt support 290 is over the scissors assembly.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A belt tensioning apparatus for a combine or harvester header comprising:
   two spaced apart longitudinal support members;
   at least one transverse member attached to each of said longitudinal support members;
   an end roller support bracket, said end roller support bracket having two bracket extensions, said bracket extensions extending longitudinally and being disposed to slidingly engage with bracket extension receivers, said bracket extension receivers each being attached to said longitudinal support members, respectively;
   a push rod, said push rod being longitudinally oriented and slidingly mounted on said transverse member, said sliding mount of said push rod on said transverse number being intermediate to said longitudinal support members and said push rod being attached to said end roller support bracket;
   said push rod being mounted to have a retracted position and an extended position; and
   an actuator, said actuator being attached to said longitudinal support members and said actuator exerting a substantially uniform force to said push rod along a range of travel of said push rod between said retracted position and said extended position and a substantially uniform force along the width of an end roller.

2. The tensioning device in claim 1 wherein said actuator exerts force along a single axis, said axis being substantially parallel with said push rod.

3. The tensioning device in claim 1 wherein said actuator is a scissors assembly.

4. The tensioning apparatus of claim 1 wherein said actuator is a hydraulic cylinder.

5. The tensioning apparatus of claim 1 wherein said attachment of said push rod to said end roller support bracket is substantially at a transverse center of said end roller support bracket.

6. The tensioning apparatus of claim 1 further comprising a spring, said spring being disposed to bias said end roller support bracket towards maintenance of a selected position.

7. The tensioning apparatus of claim 6 wherein said spring is a compression spring.

8. The tensioning apparatus of claim 6 wherein said spring is mounted on said push rod.

9. The tensioning apparatus of claim 6 wherein said spring is mounted on said push rod at a position adjacent to said end roller support bracket.

10. The tensioning apparatus of claim 1 wherein said end roller support bracket supports a drive roller.

11. The tensioning apparatus of claim 1 wherein a distance between a fully retracted position of said end roller support bracket and a fully extended position of said end roller support bracket is within a range of about 0.1 to about 0.3 times the width of a belt supported by said tensioning apparatus.

* * * * *